(12) United States Patent
Baenziger et al.

(10) Patent No.: US 7,965,013 B2
(45) Date of Patent: Jun. 21, 2011

(54) INSULATING COVER FOR A BAR TO BAR CONNECTION OF A STATOR WINDING OF AN ELECTRIC MACHINE

(75) Inventors: Matthias Baenziger, Wehinge (CH); Christian Bencharab, Andelnas (FR); Christophe Cottet, Morschwiller le Bas (FR); Bruno Frattini, Belfort (FR); Werner Ladstaetter, Daettwil (CH); Francesco Stallone, Locarno (CH); Michel Claude Verrier, Essert (FR)

(73) Assignee: Alstom Technology Ltd, Badan (CH)

( * ) Notice: Subject to any disclaimer, the term of this patent is extended or adjusted under 35 U.S.C. 154(b) by 623 days.

(21) Appl. No.: 11/626,467

(22) Filed: Jan. 24, 2007
(Under 37 CFR 1.47)

(65) Prior Publication Data
US 2008/0012442 A1  Jan. 17, 2008

(30) Foreign Application Priority Data
Jan. 24, 2006 (EP) .................... 06100783

(51) Int. Cl.
*H02K 3/04* (2006.01)
*H01B 17/00* (2006.01)
(52) U.S. Cl. ........ 310/201; 310/208; 310/179; 310/180; 174/138 R; 174/149 B; 29/235; 439/586
(58) Field of Classification Search .................. 310/179, 310/201, 208, 184, 180; 174/138 R, 149 B, 174/DIG. 30, DIG. 33; 29/235, 450; 439/586–603
See application file for complete search history.

(56) References Cited

U.S. PATENT DOCUMENTS

| | | | | | |
|---|---|---|---|---|---|
| 2,269,185 | A | * | 1/1942 | Dawson, Jr. ................... | 156/185 |
| 2,803,056 | A | * | 8/1957 | Brissey, Jr. et al. ............. | 29/450 |
| 2,994,734 | A | * | 8/1961 | Scofield et al. .................. | 174/92 |
| 2,994,735 | A | * | 8/1961 | Marshall et al. .......... | 174/138 E |
| 3,050,787 | A | * | 8/1962 | Jasniewski et al. .......... | 264/102 |
| 3,212,177 | A | * | 10/1965 | Thomas ........................ | 29/235 |
| 3,317,657 | A | * | 5/1967 | Eisler ...................... | 174/117 FF |
| 3,345,455 | A | * | 10/1967 | Goody .......................... | 174/112 |
| 3,444,407 | A | * | 5/1969 | Yates ............................ | 310/215 |
| 3,474,527 | A | * | 10/1969 | Meyer ............................ | 29/596 |
| 3,766,416 | A | * | 10/1973 | Papst et al. ..................... | 310/43 |
| 4,233,731 | A | * | 11/1980 | Clabburn et al. .............. | 29/859 |
| 4,366,201 | A | * | 12/1982 | Changani et al. ............. | 428/157 |

(Continued)

FOREIGN PATENT DOCUMENTS

DE  42 37 079  5/1994

(Continued)

OTHER PUBLICATIONS

Eurpoean Search Report for European Application No. 06100783.7 mailed on Dec. 11, 2006.

*Primary Examiner* — Burton Mullins
*Assistant Examiner* — Alex W Mok
(74) *Attorney, Agent, or Firm* — Leydig, Voit & Mayer, Ltd.

(57) ABSTRACT

An insulating cover or a bar-to-bar connection of a stator winding of an electric machine has only one opening and is made from a flexible insulating material embedding the bar-to-bar connection entirely in a tight fit. Methods for producing and applying such an insulating cover are also provided.

10 Claims, 2 Drawing Sheets

U.S. PATENT DOCUMENTS

| | | | |
|---|---|---|---|
| 4,390,745 A * | 6/1983 | Bottcher et al. | 174/73.1 |
| 4,450,318 A * | 5/1984 | Scardina et al. | 174/84 R |
| 4,584,497 A * | 4/1986 | Butman et al. | 310/214 |
| 4,602,180 A * | 7/1986 | Olson | 310/215 |
| 4,658,504 A * | 4/1987 | Sinharoy et al. | 29/873 |
| 4,703,211 A * | 10/1987 | Yazaki et al. | 310/179 |
| 4,863,536 A * | 9/1989 | Heidenhain et al. | 156/56 |
| 5,729,068 A * | 3/1998 | Gasparini et al. | 310/179 |
| 6,147,432 A * | 11/2000 | Kusase et al. | 310/260 |
| 6,462,453 B1 * | 10/2002 | Asao et al. | 310/179 |
| 6,870,103 B1 * | 3/2005 | Wiant et al. | 174/68.2 |
| 2002/0046875 A1 * | 4/2002 | Baumann et al. | 174/137 R |
| 2003/0205945 A1 * | 11/2003 | Ioi et al. | 310/216 |
| 2004/0108784 A1 * | 6/2004 | Higashino et al. | 310/179 |
| 2004/0145257 A1 | 7/2004 | Oohashi | |
| 2006/0028234 A1 * | 2/2006 | Marino et al. | 324/772 |

FOREIGN PATENT DOCUMENTS

| | | | |
|---|---|---|---|
| DE | 10123102 | | 1/2003 |
| EP | 0 077 665 | | 4/1983 |
| FR | 2068344 | | 8/1971 |
| GB | 866265 | | 4/1961 |
| GB | 1440524 | * | 6/1976 |
| GB | 2126804 | | 3/1984 |
| JP | 57036823 | | 2/1982 |

* cited by examiner

INSULATING COVER FOR A BAR TO BAR CONNECTION OF A STATOR WINDING OF AN ELECTRIC MACHINE

Priority is claimed to European Patent Application No. EP 06100783.7, filed on Jan. 24, 2006, the entire disclosure of which is incorporated by reference herein.

The present invention relates to the field of insulating covers for bar-to-bar connections of stator windings of electric machines wherein the insulating cover has only one opening.

BACKGROUND

Electric machines having a stator winding whose bar ends have brazed links or other connectors and which are insulated from one another and with respect to grounded housing parts are known in the art.

The bar ends of the stator winding of electric machines are generally insulated by means of a rigid oversized cap made of insulating material, which is pushed over the bar-to-bar connection. In the case of stator windings of large machines, these caps are filled, for example foam-filled or potted with a curing plastic. This has several drawbacks since it is always time-consuming to insulate the stator bar end because for this purpose the entire stator winding has to be brought into the correct position in each case. Moreover, relatively poor heat transfers ensue from the locally produced, thick layers of filling compound having a low thermal conductivity.

To overcome these drawbacks, various efforts have been made. For instance, the U.S. Pat. No. 5,729,068 discloses an electric machine having a stator winding which is impregnated by total immersion. The bar ends of the stator winding have soldering lugs, which are insulated from one another and with respect to, grounded housing parts. In order to simplify the assembly of the soldering lug insulation and at the same time to improve heat transfer, the soldering lugs are surrounded on all sides by a deformable insulating material, which is pervious as to impregnating resin. The insulating material is fixed by means of a shrinkable fabric, which is likewise pervious to the impregnating resin. The insulation and shrinkable fabric are impregnated and cured at the same time as the winding insulation.

The EP 0 077 665 B1 describes a tubular sleeve, for electrical insulation of an electrical conductor, the sleeve comprising interthreaded, fibrous yarns and an over coating which is coated onto and substantially covers and seals the exterior surface of that tubular sleeve, further to an electrical apparatus comprising at least one electrical conductor having a sleeve surrounding and intimately contacting said conductor.

Another effort to improve the known art is described in DE 42 37 079 A1. According to this disclosure, the blank ends of the conductor bars projecting from the end face of the lamination packet of the stator winding are coupled together to form the winding head. The blank ends of the conductor bars and the associated coupling conductors are provided with a fiber reinforced insulating cover, which is impregnated with a plastic resin.

SUMMARY OF THE INVENTION

An object of the present invention is to avoid one or more drawbacks of the prior art and to provide an insulating cover for bar-to-bar connections which is easy and quick to install and/or reduces costs for providing such insulation.

The present invention provides an insulating cover for a bar-to-bar connection of a stator winding of an electric machine wherein the insulating cover has only one opening and is made from a flexible insulating material embedding the bar-to-bar connection entirely in a direct tight fit once applied thereon. Further, methods for creating such an insulating cover are also provided.

According to the present invention the insulating cover for a bar-to-bar connection of a stator winding of an electric machine has only one opening and is made from a flexible insulating material embedding the bar-to-bar connection entirely in a direct tight fit once applied thereon. Thus no additional filling, for example foam-filling or potting with a curing plastic having a low thermal conductivity are necessary. The inventive insulating cover provides for a non-positive tight fitting of the cover on the bar-to-bar connection covering the entire blank metal without additional insulating means or adhesives.

Thus drawbacks of the prior art are avoided and an insulating cover for bar-to-bar connections which is easy and quick to install is provided and costs for providing such insulation are reduced.

An advantageous embodiment of the present invention suggests that the cover is made from silicone rubber. Silicone rubber is a rubber like material of good physical properties. It can be operated for long periods of time at temperatures up to 140° C. or intermittently up to 270° C. Silicones are organo-silicone oxide polymers characterized by a remarkable temperature stability, chemical inertness, waterproofness, and excellent dielectric properties. Silicone rubbers retain their resiliency for −50 to 270° C.

Another preferred embodiment suggests that the insulating cover is provided as a silicone rubber formed part. This combines the flexibility and elasticity of the material with the advantage of a rigid pre-formed part ready to use and easy to mount. Also high numbers of the respective insulating covers can be pre-fabricated.

A further advantageous embodiment of the present invention suggests that the silicone formed part cover has an undercut for creating a form fit with the bar-to-bar connection. This secures the insulating cover additionally.

Still another advantageous embodiment of the present invention suggests that the undersize of the cover with respect to the size of the bar-to-bar connection is 5%-10%. Thus enough elastic strength is provided for a tight direct fit on the blank metal. To avoid tearing of the silicone rubber material when stretching it for mounting the cover on the bar-to-bar connection, an enforcing rim around the opening can be provided.

Another advantageous embodiment prescribes that the cover has a wall thickness of 1.5 mm-2.5 mm. This provides sufficient dielectric properties and also allows sufficient heat transfer on the bar-to-bar connection.

One highly advantageous aspect of this embodiment is that the insulating cover is reusable. Thus, once the insulating cover needs to be removed for maintenance or other reasons, it can be quickly re-mounted afterwards. This reduces the costs for maintenance effectively.

An alternative advantageous embodiment of the present invention suggests that the cover is made from a woven fabric having thermo retractable fibers in parallel to the opening and non-retractable fibers perpendicular to the thermo retractable fibers. A woven fabric is produced by interlacing two or more sets of yarns, fibers or filaments such that the elements pass each other essentially at right angles and one set of elements is parallel to the fabric axis. A woven fabric has very good heat transfer properties if not immersed in liquid resin.

It is especially advantageous if the woven fabric cover is made from thermo retractable and non-retractable polyester fibers. Polyester fibers are polymer fibers, which are chemically synthesized. They are made from polyethylene terephtalate and have excellent dielectric properties.

Advantageously, the woven fabric cover has an oversize of 3%-5% with regard to the widest portion of the bar-to-bar connection. Thus, the insulating cover can easily slipped over the bar-to-bar connection to be insulated.

Further, it is advantageous that the woven fabric cover has a wall thickness of 1.0 mm-3.00 mm. This wall thickness has proven reliable insulating properties without using any additional insulating material.

According to the present invention, an advantageous process for manufacturing an insulating cover for a bar-to-bar connection of an electric machine comprises the following steps:

providing a mold having the shape of the bar-to-bar connection to be covered but with dimensions slightly smaller than the bar-to-bar connection;

casting the cover by inserting liquid silicone rubber in the mold; and vulcanizing the cover.

This process can be enhanced by performing the further step of providing a core with an undercut. This is advantageous if the shape of the cover has an undercut for creating a form fit in direct contact with the bar-to-bar connection. This process produces the silicone rubber formed element insulating cover as described above.

Another advantageous embodiment of the above process comprises the step of mounting the cover on the bar-to-bar connection by widening the elastic rubber material and letting it retract on the predetermined position thus creating a tight fit. By executing this step in reverse, the cover can be taken off the bar-to-bar connection without damaging it, which has the positive effect that the same cover can be re-used several times.

An alternative process for manufacturing an insulating cover for a bar-to-bar connection of an electric machine according to the present invention comprises the following steps:

providing a silicone tape; and wrapping the silicone tape around the bar-to-bar connection under a predetermined tension to allow fusion of the tape.

This is advantageous in cases where only small numbers of covers are needed and it is not cost efficient to produce a mold. In such a case the silicone tape has for example a width of 20 mm to 50 mm.

An alternative process for manufacturing an insulating cover for a bar-to-bar connection of an electric machine according to the present invention comprises the following steps:

providing a woven fabric tube made of insulating material wherein the circumferential fibers are made of a thermo retractable fiber and the longitudinal fibers are made of a non retractable fiber;

closing one end of the tube by sewing or bonding thus creating the cover;

mounting the woven fabric cover on the bar-to-bar connection; and shrinking the cover to the size of the bar-to-bar connection by applying heat at a minimum of 130° C. thus creating a tight fit.

Thus a tight form fit insulation cover in direct contact with the blank metal of the bar-to-bar connection without using any additional insulation material is provided. The fabric can be made of different fiber suitable combinations including thermoplastic and inorganic fibers. However, the combination of thermo retractable polyester fibers and non-retractable polyester fibers has proven to provide a very advantageous woven fabric since the dielectric and heat transfer properties are uniform. The heating step can be done together with the thermosetting of the insulation of the stator winding, thus saving time and costs.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, in which.

The drawings are merely schematic sketches and serve explicatory reasons only.

DETAILED DESCRIPTION OF THE PREFERRED EMBODIMENTS

Figure 1:
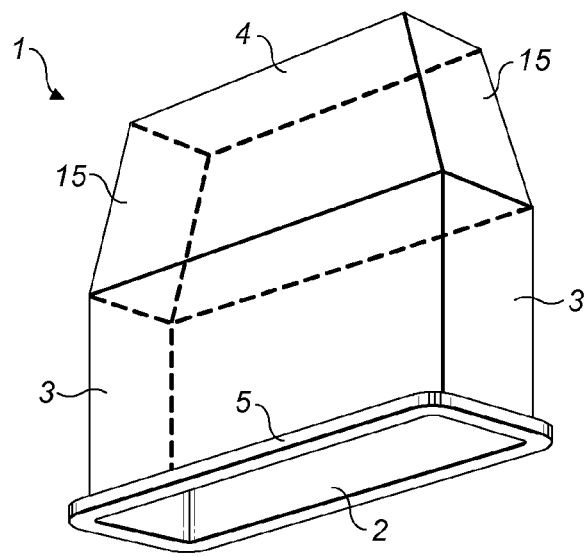
FIG. 1 shows a perspective view of a first embodiment of an insulating cover according to the present invention.

Referring now to the drawings, wherein like reference numerals designate identical or corresponding parts throughout the several views, a first preferred exemplary embodiment of the invention is reproduced in FIG. 1 in a schematic perspective view of an insulating cover 1.

In this embodiment the insulating cover 1 is made as a silicone rubber formed part, which was cast in a mold and vulcanized. The cover 1 has a rectangular opening 2 located at the lower portion in the drawing. The opening 2 could be surrounded by a rim 5 to give it more stability and strength and to avoid tearing of the silicone rubber material.

From the opening 2 flexible, elastic sidewalls 3 are extending upwards in the drawing perspective. In the upper portion of the insulating cover 1, the walls 15 of the small sides could be tilted slightly towards the center of the cover 1. This is because of the specific shape of the bar-to-bar connection on some generator types to be insulated by the cover 1. The cover 1 is closed on the upper portion by a top 4, which is an integral part of the formed part. In the perspective view of FIG. 1 the not visible portions of the insulating cover 1 are shown in dashed lines.

The wall thickness of the sidewalls 3,15 and the top 4 is about 1.5 mm which provides enough strength and elasticity and which provides excellent dielectric properties. Nevertheless, there is sufficient heat transfer permitted by the silicone rubber to avoid heat sinks.

Figure 2:
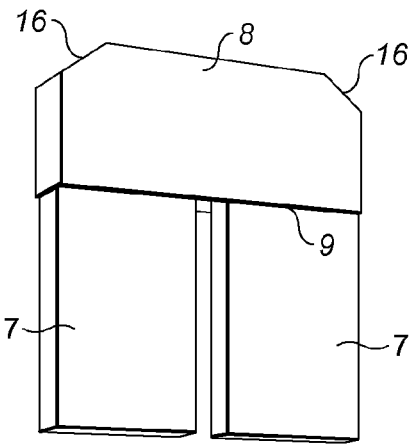
FIG. 2 shows a detail view of one bar-to-bar connection of an electric machine.

FIG. 2 shows a detail view of one bar-to-bar connection 6 of a stator winding of an electric machine. According to this embodiment, the two end portions of the rectangular bars 7, 7 are running in parallel. The blank metal of the end portions of the bars 7, 7 is electrically connected by a yoke shaped connector 8 which is mounted transversally on top of the two ends of the bars 7,7. From the connector 8 an edge 9 is created towards the flush surface of the ends of the bars 7,7. The edge 9 is perpendicular to the ends of the bars 7,7. The upper portion of the connector 8 has tilted sidewalls 16 on the left and the right side.

Figure 3:
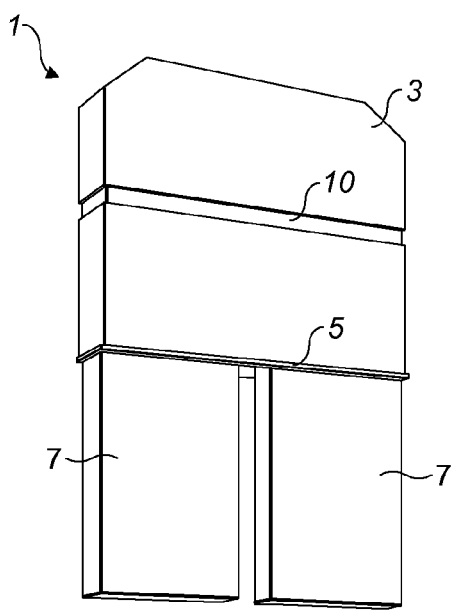
FIG. 3 shows the insulating cover of FIG. 1 insulating a bar-to-bar connection according to FIG. 2.

FIG. 3 shows the insulating cover 1 of FIG. 1 covering and insulating a bar-to-bar connection 6 according to FIG. 2. It has to be noted, that the flexible insulating cover 1 has generally the shape of the bar-to-bar connection 6. However, the cover 1 has a slightly smaller size than the bar-to-bar connection 6. Thus, due to this "undersize" of the cover 1, it needs to be stretched for mounting it on the bar-to-bar connection 6. Due to the elasticity of the silicone rubber material of the insulating cover 1, the cover 1 is embedding the bar-to-bar connection 6 tightly once mounted thereon. No additional filling or potting with a curing plastic is necessary nor is any glue needed to attach the insulating cover 1 directly on the blank metal. The silicone rubber insulating cover 1 provides a non-positive tight fit and is re-usable by simply stripping cover 1 off the bar-to-bar connection 6. Due to the tight fit of the insulating cover 1, the contour of the bar-to-bar connection 6 is showing through the cover 1 and in the area of the edge 9 of the connector 8, an impression 10 shows to the outside.

Figure 4:
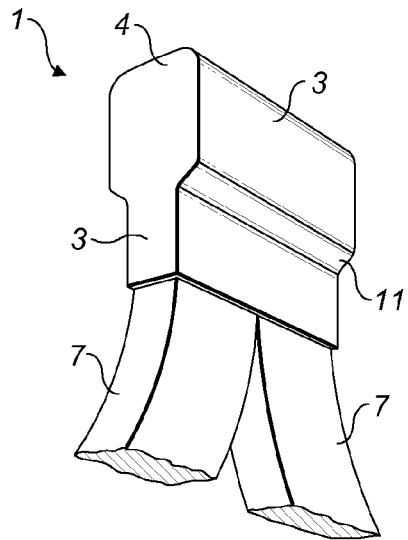
FIG. 4 shows a perspective view of an alternative bar-to-bar connection insulated by an alternative embodiment according to the present invention.

FIG. 4 shows a perspective view of an alternative bar-to-bar connection insulated by an alternative embodiment of an insulating cover 1 according to the present invention. According to this embodiment a cover 1 made of silicone rubber is pulled over the bar-to-bar connection so the sidewalls 3 and top 4 cover entirely the blank metal. The cover 1 has a shape corresponding to the shape of the bar-to-bar connection but with a 5% undersize. Due to the geometry of the connector, the cover 1 has an undercut 11 running transversely to the ends of the bars 7, 7. As a result of the undercut, a form fit connection between the bar-to-bar connection and the cover 1 is established in addition to the non-positive fit created by the elasticity of the silicone rubber material.

Figure 5:
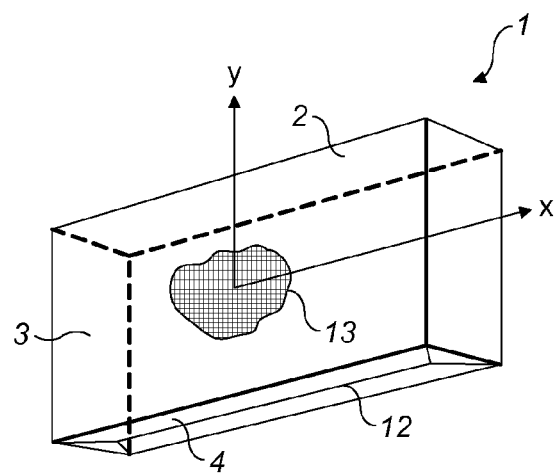
FIG. 5 shows a perspective view of a further embodiment of an insulating cover according to the present invention.

FIG. 5 shows a perspective view of a further embodiment of an insulating cover 1 according to the present invention. The insulating cover 1 has generally the shape of a parallelepiped having sidewalls 3 and one rectangular opening 2, which is shown on the top of the cover 1 in FIG. 5.

The cover 1 according to this embodiment is made from a woven insulating fabric as indicated with reference numeral 13. The fibers of the fabric are oriented in x-direction, i.e. in parallel to the level of the opening 2, and in y-direction, i.e. perpendicular to the fibers of the x-direction. In the embodiment shown in FIG. 5, the fibers in x-direction are thermo retractable, i.e. shrinkable polyester fibers reassembling the warp threads of the fabric. The fibers in the y-direction, i.e. the weft threads are made of non-retractable polyester fibers. The closed top 4 of the insulating cover 1 (in this drawing shown on the lower portion), is made by bonding the fibers of the fabric together, creating a bonding seam 12. Using polyester for both warp and weft threads, the excellent dielectric properties are constant over the whole fabric. The non-visible parts of the cover 1 are indicated by dashed lines in this figure.

Figure 6:
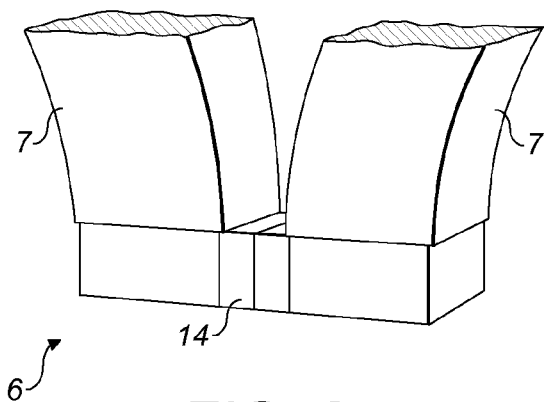
FIG. 6 shows a detail view of a further bar-to-bar connection.

FIG. 6 shows a detail view of a further bar-to-bar connection 6 having two ends of the bars 7, 7 connected by a brazed link 14.

Figure 7:
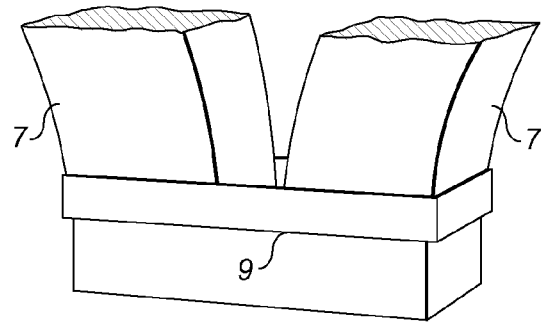
FIG. 7 shows the insulating cover of FIG. 5 insulating a bar-to-bar connection according to FIG. 6.

FIG. 7 shows the insulating cover 1 of FIG. 5 insulating the bar-to-bar connection 6 according to FIG. 6. It has to be noted that when using a cover made of woven polyester fabric, the cove is slightly oversized, i.e. in the present embodiment the opening 2 is 3% larger than the widest portion of the bar-to-bar connection 6. This does not mean that the cover might only shrink 3%. In fact, it shrinks much more if needed. Once the cover 1 is pulled over the bar-to-bar connection 6, it is heated at a minimum of 130° C. Due to the temperature the fibers in x-direction of the insulating fabric are shrinking until the fabric tightly embeds the blank metal of the bar-to-bar connection. The final shape of the cover 1 is illustrated in FIG. 7, also showing the edge 9 created by the shape of the bar-to-bar connection 6. The fabric has a thickness of 1 mm, enough to provide sufficient insulation and to allow the necessary heat transfer.

Numerous modifications and variations of the present invention are possible in light of the above teachings. It is therefore to be understood that, within the scope of the appended claims, the invention may be practiced otherwise than as specifically described herein.

What is claimed is:

1. An insulating cover for a bar-to-bar connection of a stator winding of an electric machine, the insulating cover comprising:
   a pre-formed part of flexible insulating material having an undersize of 5%-10% relative to the bar-to-bar connection and having not more than one opening, and
   wherein the insulating material embeds the bar-to-bar connection entirely in a direct tight fit.

2. The insulating cover as recited in claim 1, wherein the flexible insulating material includes silicone rubber.

3. The insulating cover as recited in claim 2, wherein the cover has a wall thickness of 1.5 mm-2.5 mm.

4. The insulating cover as recited in claim 1, wherein the pre-formed part includes an undercut configured to provide a form fit with the bar-to-bar connection.

5. The insulating cover as recited in claim 1, wherein the cover is reusable.

6. An insulating cover for a bar-to-bar connection of a stator winding of an electric machine, the insulating cover comprising a flexible insulating material molded into a shape corresponding to the bar-to-bar connection with an undersize of 5%-10% relative to the bar-to-bar connection.

7. The insulating cover as recited in claim 6, wherein the cover includes not more than one opening.

8. The insulating cover as recited in claim 6, wherein the flexible insulating material includes silicone rubber.

9. The insulating cover as recited in claim 6, wherein the cover has a wall thickness of 1.5 mm-2.5 mm.

10. The insulating cover as recited in claim 6, wherein the cover is reusable.

* * * * *